(12) United States Patent
Schade

(10) Patent No.: US 8,424,628 B1
(45) Date of Patent: Apr. 23, 2013

(54) VEHICLE WITH GOLF IMPROVEMENTS

(76) Inventor: Christopher W. Schade, Fishers, IN (US)

( * ) Notice: Subject to any disclaimer, the term of this patent is extended or adjusted under 35 U.S.C. 154(b) by 135 days.

(21) Appl. No.: 13/159,084

(22) Filed: Jun. 13, 2011

Related U.S. Application Data

(63) Continuation-in-part of application No. 12/548,313, filed on Aug. 26, 2009, now Pat. No. 7,958,961.

(60) Provisional application No. 61/091,967, filed on Aug. 26, 2008.

(51) Int. Cl.
*B60K 28/04* (2006.01)

(52) U.S. Cl.
USPC ........... 180/273; 180/19.1; 180/218; 280/727

(58) Field of Classification Search ............... 180/19.1, 180/19.2, 19.3, 218, 273; 280/727
See application file for complete search history.

(56) References Cited

U.S. PATENT DOCUMENTS

| | | | |
|---|---|---|---|
| 3,812,929 A | 5/1974 | Farque | |
| 4,106,583 A | 8/1978 | Nemeth | |
| 4,848,504 A | 7/1989 | Olson | |
| 4,874,055 A | 10/1989 | Beer | |
| 5,346,028 A | 9/1994 | Cassano | |
| D389,782 S | 1/1998 | Scott et al. | |
| 5,711,388 A | 1/1998 | Davies et al. | |
| 5,944,132 A | 8/1999 | Davies et al. | |
| 5,971,091 A | 10/1999 | Kamen et al. | |
| 5,975,225 A | 11/1999 | Kamen et al. | |
| 6,288,505 B1 | 9/2001 | Heinzmann et al. | |
| 6,415,879 B2 | 7/2002 | Kamen et al. | |
| 6,659,208 B2 | 12/2003 | Gaffney et al. | |
| 6,779,621 B2 | 8/2004 | Kamen et al. | |
| 7,086,491 B2 | 8/2006 | Matte | |
| 7,958,961 B1 * | 6/2011 | Schade | 180/273 |
| 2001/0022242 A1 * | 9/2001 | Kamen et al. | 180/8.2 |
| 2001/0032743 A1 * | 10/2001 | Kamen et al. | 180/7.1 |
| 2002/0063006 A1 * | 5/2002 | Kamen et al. | 180/171 |
| 2006/0191726 A1 * | 8/2006 | Matte | 180/65.1 |
| 2007/0131461 A1 * | 6/2007 | Treadwell et al. | 180/19.1 |
| 2007/0205241 A1 * | 9/2007 | Mourao | 224/401 |
| 2009/0242285 A1 * | 10/2009 | Whetstone, Jr. | 180/19.2 |

* cited by examiner

*Primary Examiner* — Eric Culbreth
*Assistant Examiner* — Barry Gooden, Jr.
(74) *Attorney, Agent, or Firm* — Middleton Reutlinger; Chad D. Bruggeman; John F. Salazar

(57) ABSTRACT

A SEGWAY adapted with a mechanism to manually override the rider detection mechanical sensors to allow a golfer to choose to ride or not ride the SEGWAY while playing golf. A handle attachment extends outwardly enabling the golfer to manually steer and thus control the speed and direction of the SEGWAY while not riding the SEGWAY. The golfer can ride, walk, or run as desired in unison with the improved SEGWAY. A wireless controller and steering mechanism allow the golfer to remotely operate and control the speed and direction of the SEGWAY.

20 Claims, 11 Drawing Sheets

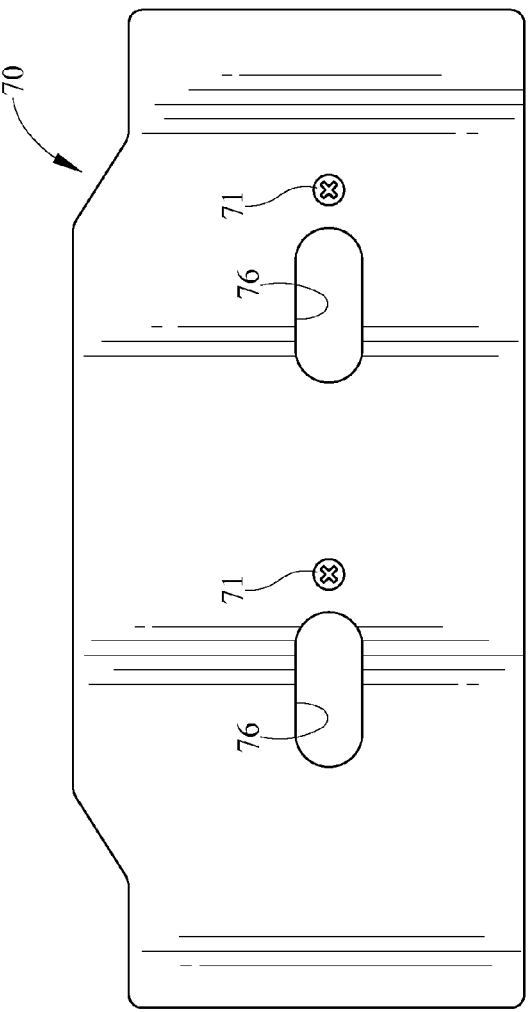
FIG. 4C
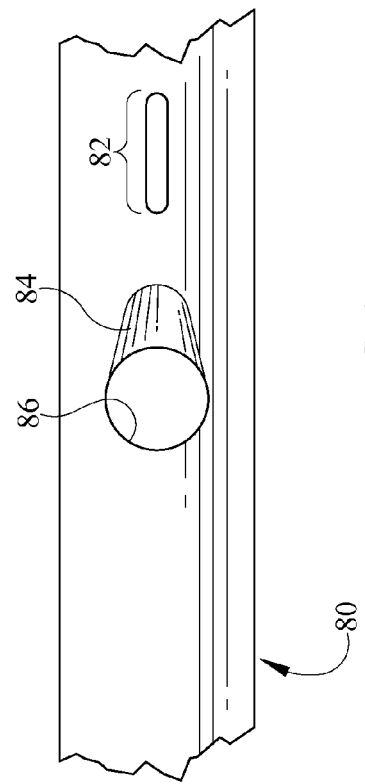
FIG. 4B
FIG. 4A

VEHICLE WITH GOLF IMPROVEMENTS

CROSS-REFERENCE TO PRIOR APPLICATION

This application is a continuation in part of and claims priority to and benefit from, U.S. patent application Ser. No. 12/548,313, filed on Aug. 26, 2009, now U.S. Pat. No. 7,958,961, issuing Jun. 14, 2011, which claims priority to and benefit from (under 35 U.S.C. §119(e)) U.S. Provisional Patent Application No. 61/091,967 filed on Aug. 26, 2008, herein incorporated by reference.

TECHNICAL FIELD

The present invention relates to a SEGWAY and particularly to a SEGWAY with golf improvements.

BRIEF DESCRIPTION OF THE DRAWINGS

FIG. 4A shows a top view of the tab of the manual override mechanism of FIG. 3;

FIG. 4B shows a bottom view of the kick plate of the manual override mechanism of FIG. 3, with portions of the kick plate partially broken away;

FIG. 4C shows a top view of the right base plate of the manual override mechanism of FIG. 3;

DETAILED DESCRIPTION

Figure 1:
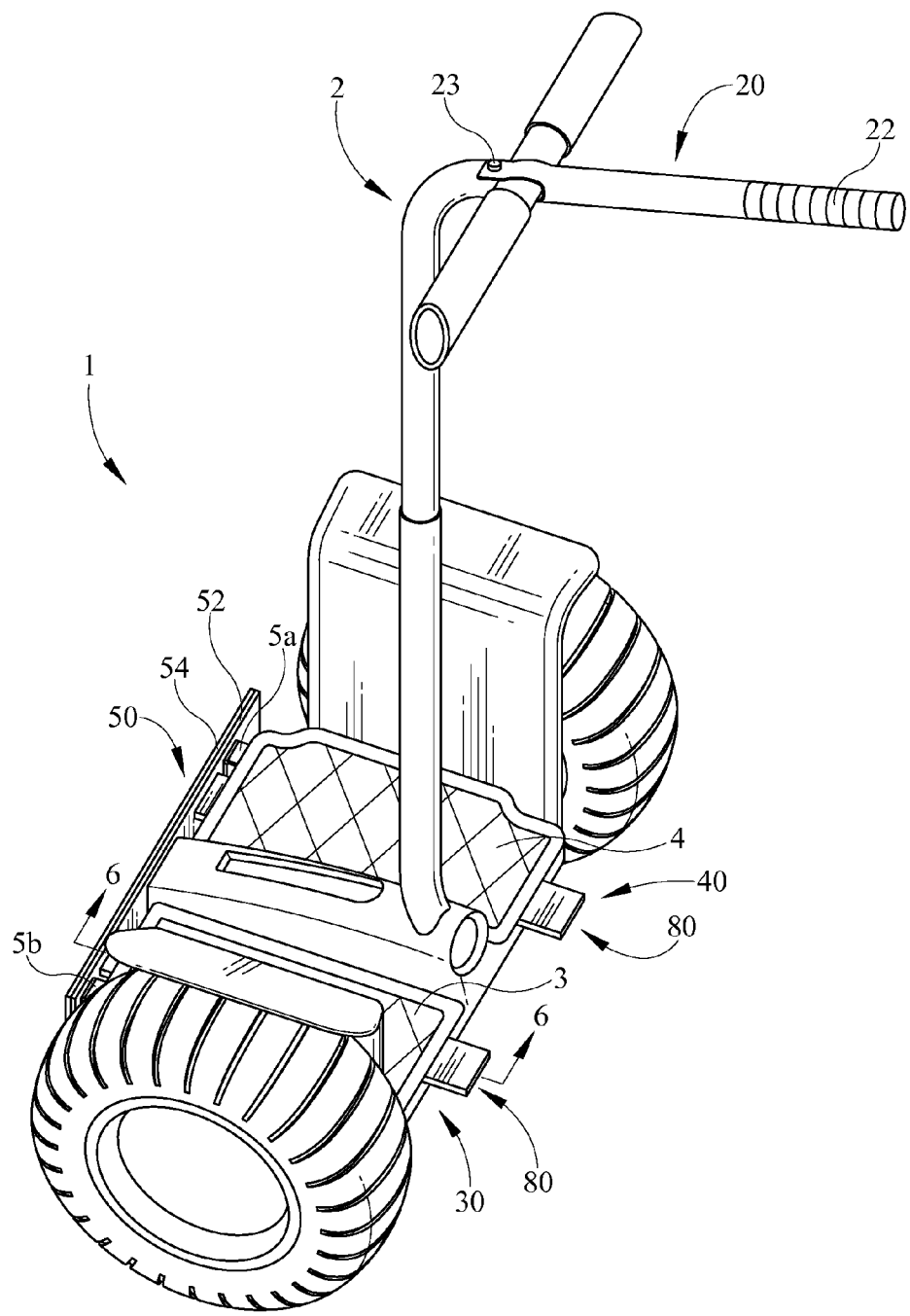
FIG. 1 shows a top perspective view of an embodiment of the SEGWAY with golf improvements, illustrating the kick plates in the engaged position.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

The SEGWAY has been available in recent years to enable golfers to ride with their golf bag positioned over a single wheel, as in the SEGWAY x2 Golf. However, the rider/golfer must dismount the SEGWAY, turn off the device, and lay the device back onto the golf bag stand before selecting his/her club due to rider detection sensors. This results in the golf bag being substantially vertical. After completing the swing the golfer must reverse these laborious steps to get back on the SEGWAY to proceed to the next golf ball location.

The presently designed invention as shown in FIGS. 1-6 enables the golfer to manually override the rider detection sensors in order to direct and control the speed of the improved SEGWAY 1 while not requiring the user to be presently riding the SEGWAY, as well as having the option of riding all or portions of the golf course. The improved SEGWAY 1 does not have to be turned off nor laid over to go swing the golf club. The improved SEGWAY 1 remains in the upright and riding position. The golfer has the option of riding the improved SEGWAY 1 or directing the improved SEGWAY when the user is on foot (not riding), at any pace such as walking, jogging, or running. The golfer now has the option to exercise by choosing not to ride the SEGWAY, eventhough the golf bag (not shown) is still being carted by the SEGWAY.

The presently designed SEGWAY improvement is used to provide the golfer with the ability to choose whether to ride or not ride the improved SEGWAY 1 while playing golf. The SEGWAY 1 improvement comprises an elongated handle attachment or "Balance Control Handle Extension Attachment" or acronym "BHx" 20 projecting forward from the existing handle bars 2 of the SEGWAY. The handle attachment 20 is a 2" diameter pipe 28 ½" in length with a 4" U-cut into the one end of the pipe. The U-cut end of the handle attachment 20 adjacent handle bars 2 may be secured by a fastener 23. The golfer, positioned in front of the SEGWAY, directs the elongated handle attachment 20 in the direction of travel and controls the speed of the SEGWAY by simply applying or removing downward pressure of the handle attachment. The user is able to set his/her own pace while not riding, with the SEGWAY traveling in unison. The handle attachment 20 may be a variety of shapes and may have a grip 22 for hand comfort.

Figure 2:
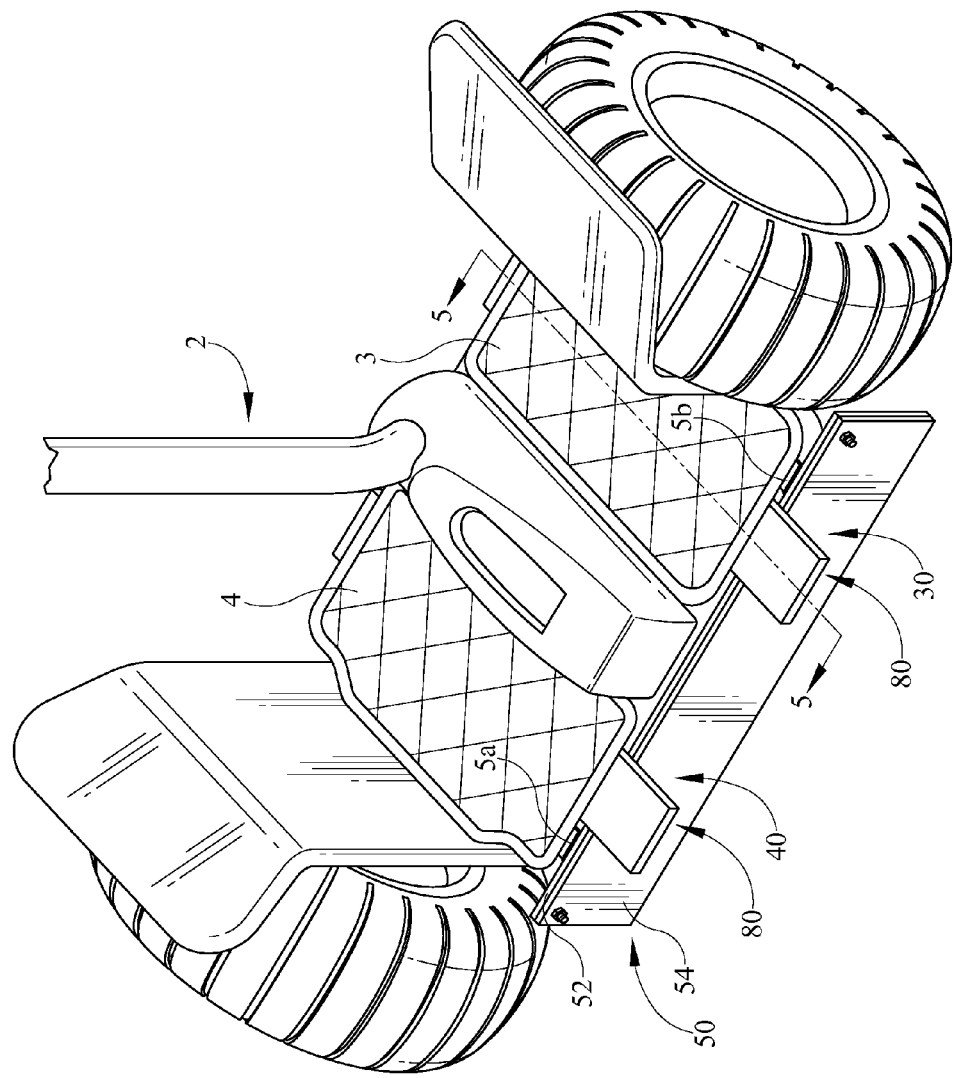
FIG. 2 shows an enlarged, top perspective view the embodiment of FIG. 1, illustrating the kick plates in the disengaged position.
Figure 3:
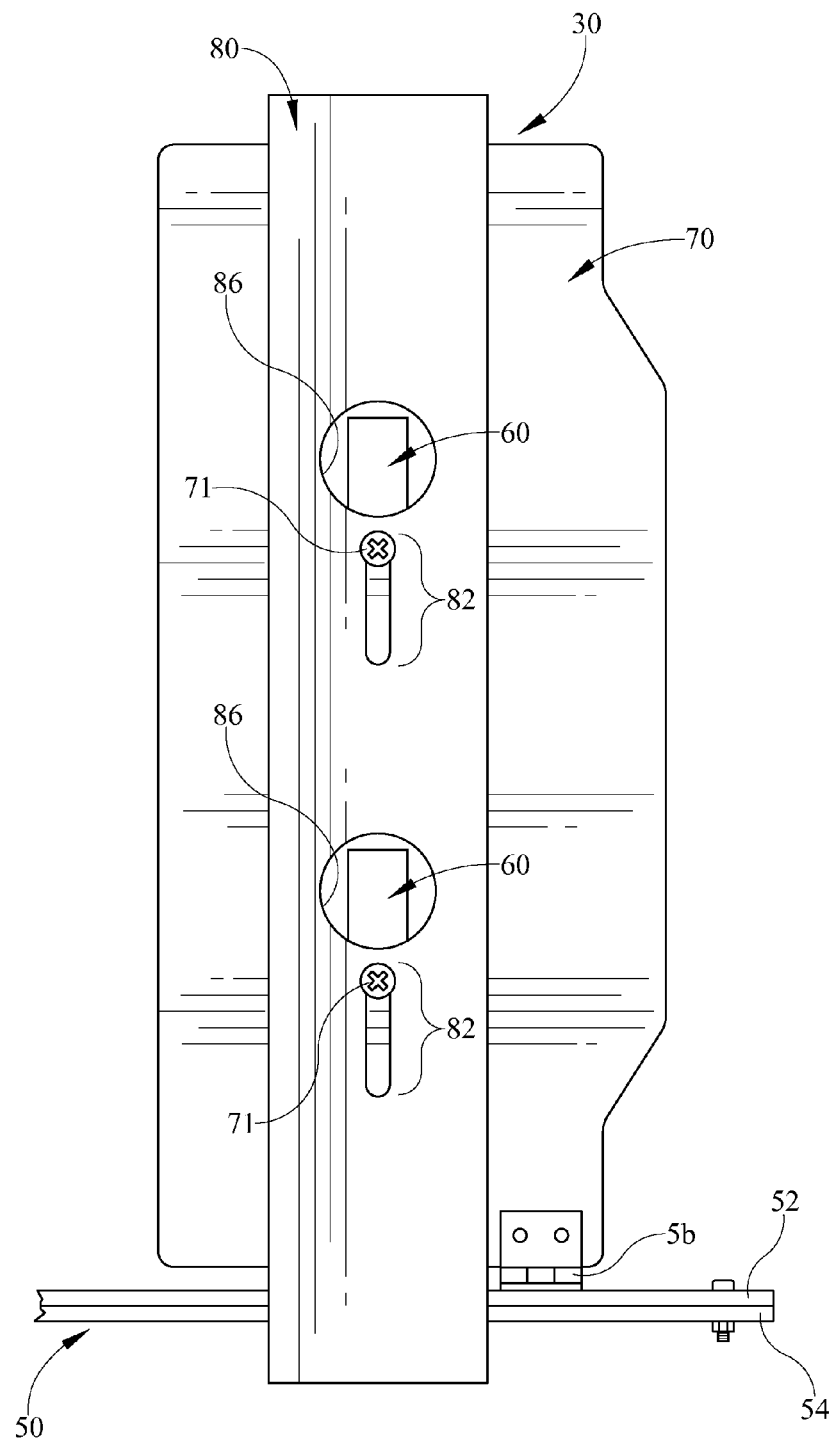
FIG. 3 shows a top view of the right side manual override mechanism and counterweight of FIG. 2, with the counter weight partially broken away.
Figure 5:
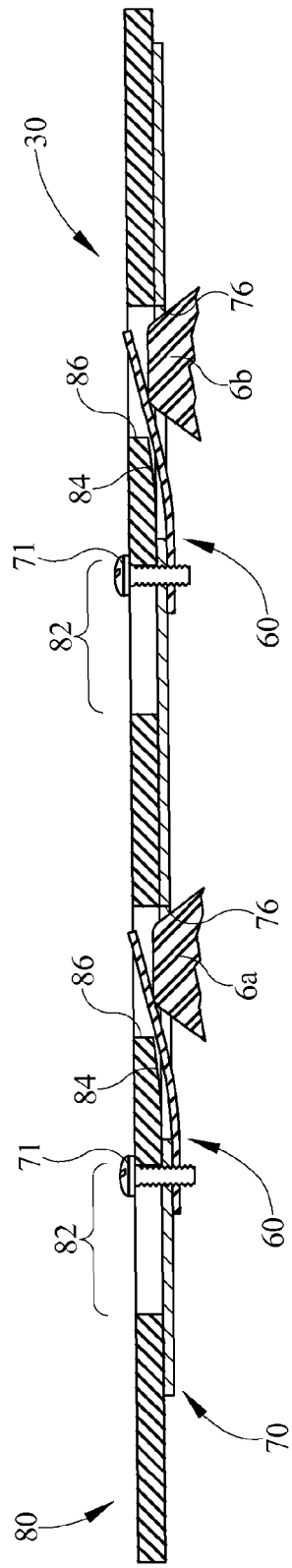
FIG. 5 shows a sectional view of override mechanism of FIG. 2 taken along line 5-5 illustrating the kick plate in the disengaged position.
Figure 6:
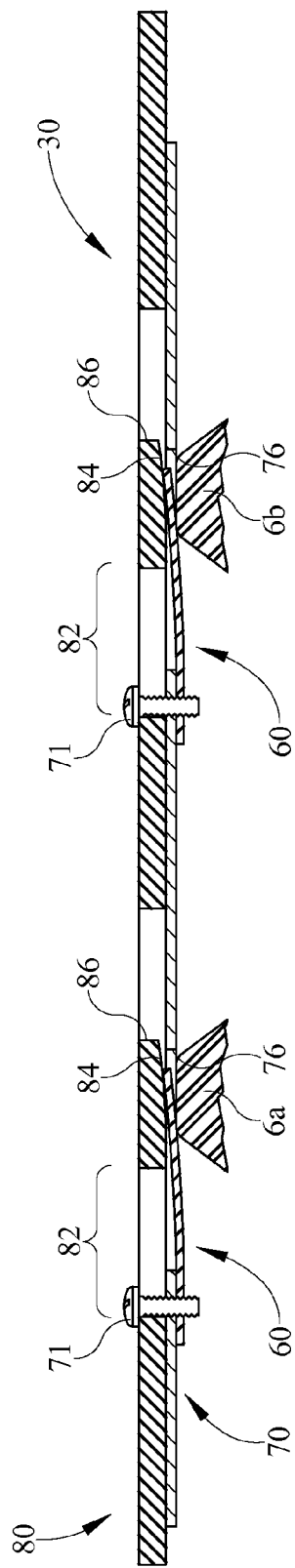
FIG. 6 shows a sectional view of override mechanism of FIG. 1 taken along line 6-6 illustrating the kick plate in the engaged position and overriding the rider detection sensor of the SEGWAY.

As shown in FIG. 6, the existing rider detection sensors or buttons 6a, 6b of each of the existing step pads 3 and 4 are manually overridden to allow for the improved SEGWAY 1 to engage and move without an individual thereon. Thus, once the improved SEGWAY 1 is turned on and balanced, a pair of manual override mechanism 30 and 40 is engaged to override the rider detection sensors of each step pads 3, 4. If however only one override mechanism is engaged, the SEGWAY will still function substantially as intended except for that the SEGWAY will be slower to turn in the direction of the single engaged override mechanism. A pair of sensors 6a, 6b are disposed under each step pad 3, 4. Sensors 6a and 6b under step pad 3 are shown in FIGS. 5 and 6. As shown in FIGS. 1, 2, and 3, a counterweight or "counter weight kick stand" 50 serves to balance the improved SEGWAY 1. Counterweight 50 serves to balance the weight of the existing handle 2 along with the weight of the elongated handle 20, compensating for the lack of a rider. Counterweight 50 is connected to the rear of the SEGWAY platform by a pair of hinges 5a and 5b. Counterweight 50 is a plate 52 made of metal, such as steel; along with tire tread 54 disposed on the outward facing surface of the metal plate 52. The counterweight 50 weighs about 19 lbs. Even with the manual override mechanisms 30 and 40 engaged, the user is able to step back on the SEGWAY and immediately ride. With the pair of rider detection sensors 6a and 6b overridden by the override mechanisms 30 and 40 and counterweight 50 compensating for the handle attachment and lack of rider, the improved SEGWAY 1 may remain balanced and engaged during the entire golfer's game.

The manual override mechanisms 30 and 40 of the present embodiment is positionable between an engaged position (FIGS. 1 and 6) and a disengaged position (FIGS. 2, 3, and 5). Each manual override mechanism 30 and 40 is affixed under their respective step pads 3, 4. When in the engaged position shown in FIGS. 1 and 6, a kick plate 80 (FIG. 4B) is positioned towards the front of the SEGWAY 1 whereby a pair of tabs 60 (FIG. 4A) is biased downwardly in contact with respective rider detection sensors 6a, 6b thereby mimicking that a user is currently standing on the SEGWAY. When in the disengaged position shown in FIGS. 2 and 5, the kick plate 80 is positioned towards the rear of the SEGWAY 1 whereby the pair of tabs 60 is unbiased upwardly out of contact with the rider detection sensors 6a, 6b. While the override mechanisms 30 and 40 are in its disengaged position, a rider is able to step upon the step pads 3 and 4 and engage the rider detection sensors just as if the override mechanism was not present. When the kick plates 80 are in the disengaged position (FIGS. 2, 3, and 5), the kick plates 80 extend out from underneath the rear of the step pads 3, 4, whereby the user has access to push or slide the kick plate forward into the engaged position (FIGS. 1 and 6). Once in the engaged position, the kick plates 80 extends out from underneath step pads 3, 4 in the front of the SEGWAY, thus presenting itself for the user to push or slide the kick plate back in the disengaged position. Each kick plate 80 travels along its straight path by a series of slots 82 each restricted by a respective bolt 71 therethrough and extending from the SEGWAY platform and through the base plate 70 (FIG. 4C), thus allowing the kick plate 80 to travel/slide between its disengaged position and the engaged position. As shown in FIGS. 4B, 5, 6, each kick plate 80 also may have a groove 84 adjacent the opening 86 which guides the smaller width of each tab 60 when biased between the engaged and disengaged positions. The kick plates 80, tabs 60, and base plates 70 may be made from metal. Each base plate 70 is rigidly affixed to the platform and is shaped to substantially conform to the surface area under each respective left step pad 4 or right step pad 3. Each base plate 70 has a corresponding opening 76 permitting the rider detection sensor 6a or 6b to pass therethrough. Each tab 60 is fastened to the bottom surface of the base plate 70 adjacent to and extending into the opening 76 above the sensor 6a, 6b when assembled. Each base plate opening 76 corresponds with the openings 86 of the kick plate 80. As shown in FIG. 5, the kick plate opening 86 is aligned with the base plate opening 76 the tabs 60 are not biased into contact with the sensors 6a, 6b the rider detection sensors will not be engaged. However as shown in FIG. 6, as the kick plate 80 travels from the disengaged position to the engaged position, the kick plate opening 86 traverses out of alignment with the base plate opening 76 and sensor 6a, 6b resulting in groove 84 and material adjacent the kick plate opening 86 to bias tabs 60 downwardly to depress and engage the rider detection sensors 6a, 6b. Although it is not shown in the figures, a handbrake and tension cable may be included to assist a variety of manual override mechanisms in overriding the rider detection sensors.

Figure 7:
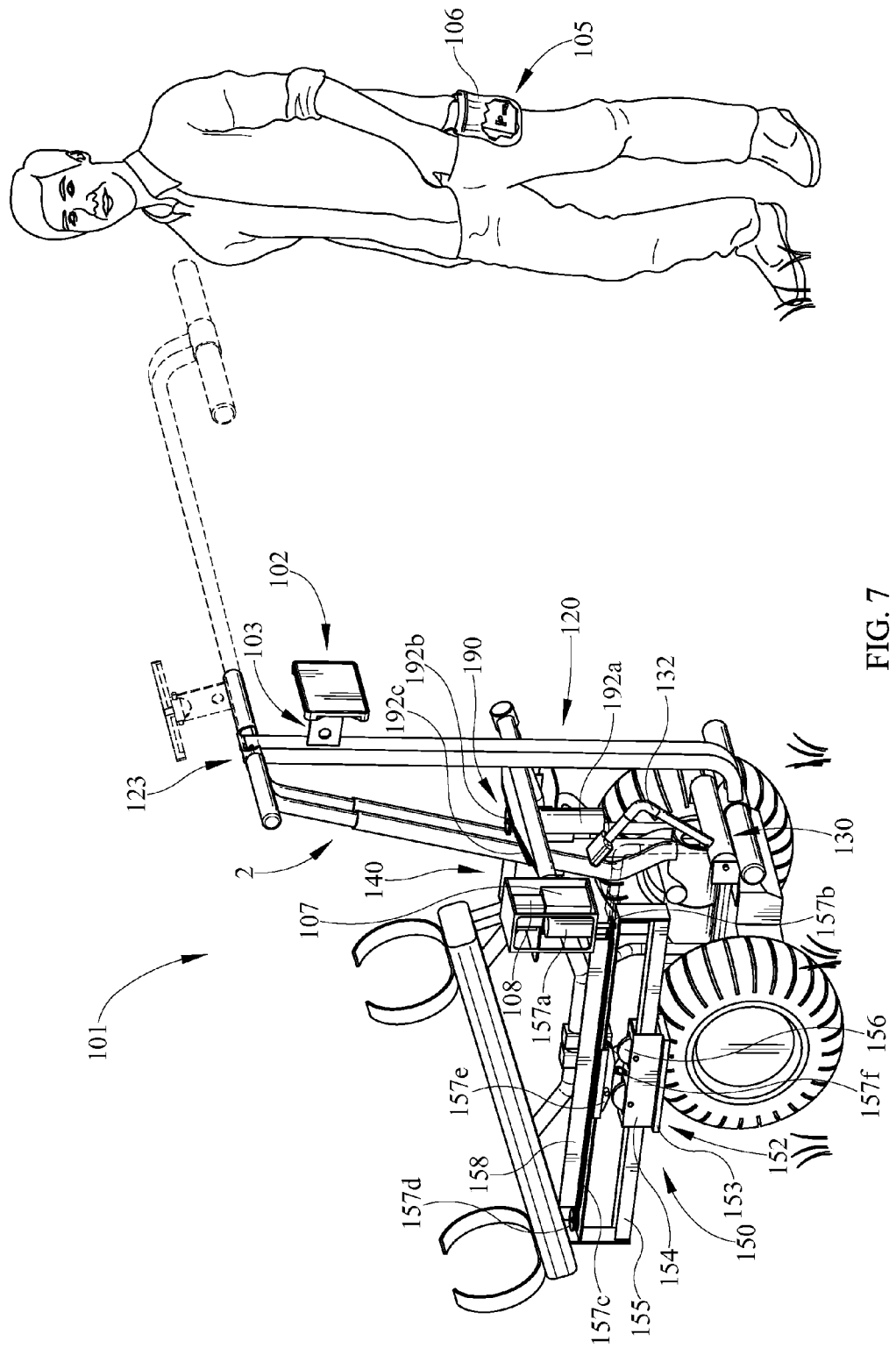
FIG. 7 shows a top perspective view of another embodiment of the SEGWAY with golf improvements, illustrating the override mechanism in the engaged position and the steering mechanisms in the balanced position, the position of the override mechanism in the disengaged position is shown in broken lines and the hinged handle attachment in the second position is shown in broken lines.

Another embodiment of an improved SEGWAY 101 is illustrated in FIGS. 7-11. As shown in FIG. 7, the user is able to remotely operate the SEGWAY 101 in a "hands free" operation enabling the user to navigate the SEGWAY while not riding. In choosing not to ride, the user can control the speed and direction of the SEGWAY remotely with a wireless controller 105. The controller 105 may be a variety different devices in order to operate the steering mechanism 140 and may be handheld, coupled to the user's body, or coupled to an article of clothing, such as a bag holder 106 clipped to the user's pants.

Figure 10:
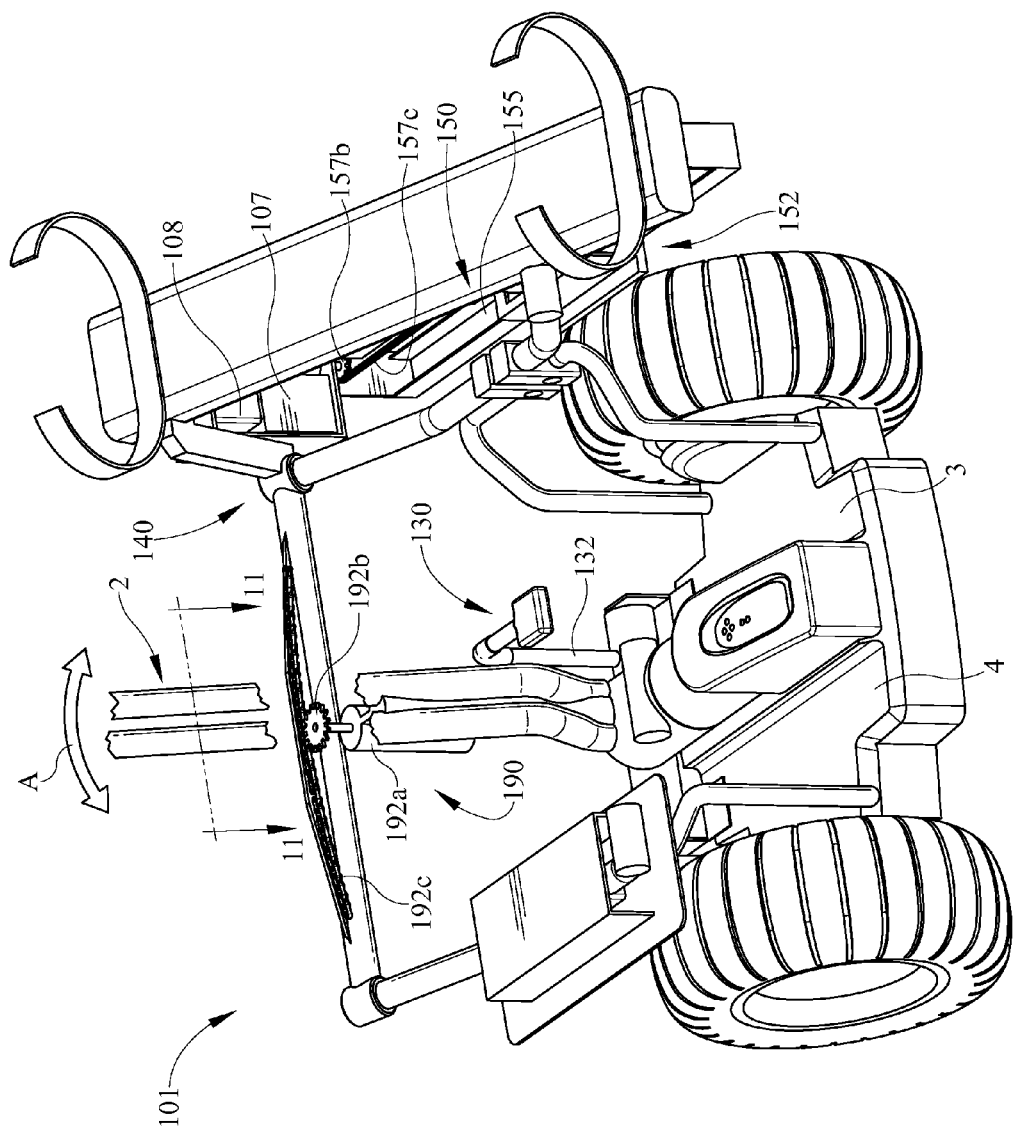
FIG. 10 shows a top perspective view of the lateral steering mechanism of FIG. 7, illustrating the SEGWAY handle in the straight or balanced steering position.

As shown in FIGS. 7 and 10, the manual override mechanism 130 is illustrated as a lever 132 rotatable between an engaged position (FIG. 7) to a disengaged position (FIG. 10). When the lever 132 is rotated to the engaged position (FIG. 7), the attached slide or kick plate 80 slides/translates to depress the pair of rider detection sensors 6a, 6b of each step pads 3, 4 as described above. Although not shown, a spring may be used to assist the slide plate 80 and/or lever 132 back to the disengaged position or vice versa to the engaged position.

With the manual override mechanism 130 engaged (FIG. 7), the SEGWAY 101 will be balanced and ready to be navigated remotely by the controller 105 or directly by the user with an elongated handle attachment 120 as described above. When navigating the SEGWAY 101 remotely, the controller 105 operates the steering mechanism 140. The steering mechanism 140 coordinates to simulate a riding user's center of gravity to enable the SEGWAY 101 to move forward or backwards as well as a riding user's ability to steer left and right.

Figure 8:
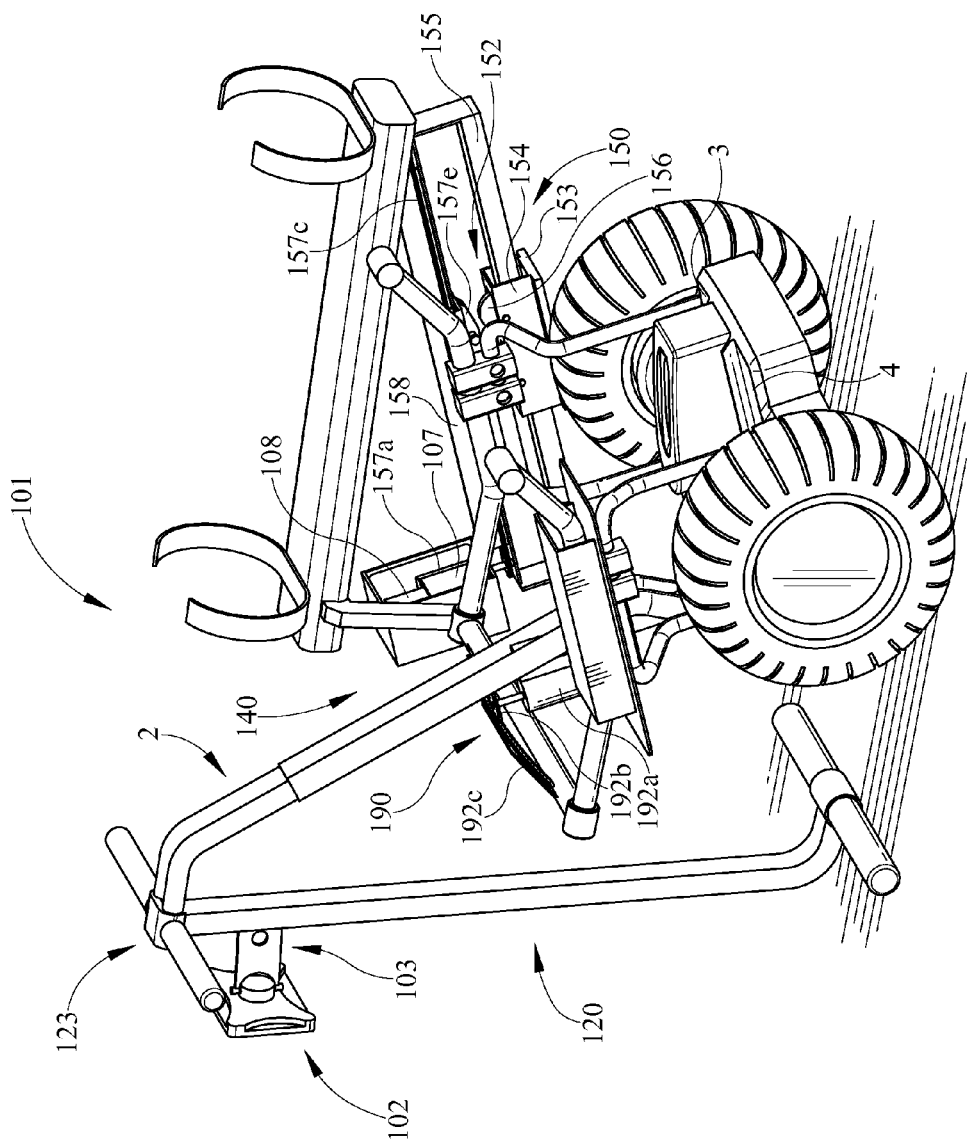
FIG. 8 shows top perspective view of the embodiment of FIG. 7, illustrating the elongated handle attachment in the kick-stand position.
Figure 9:
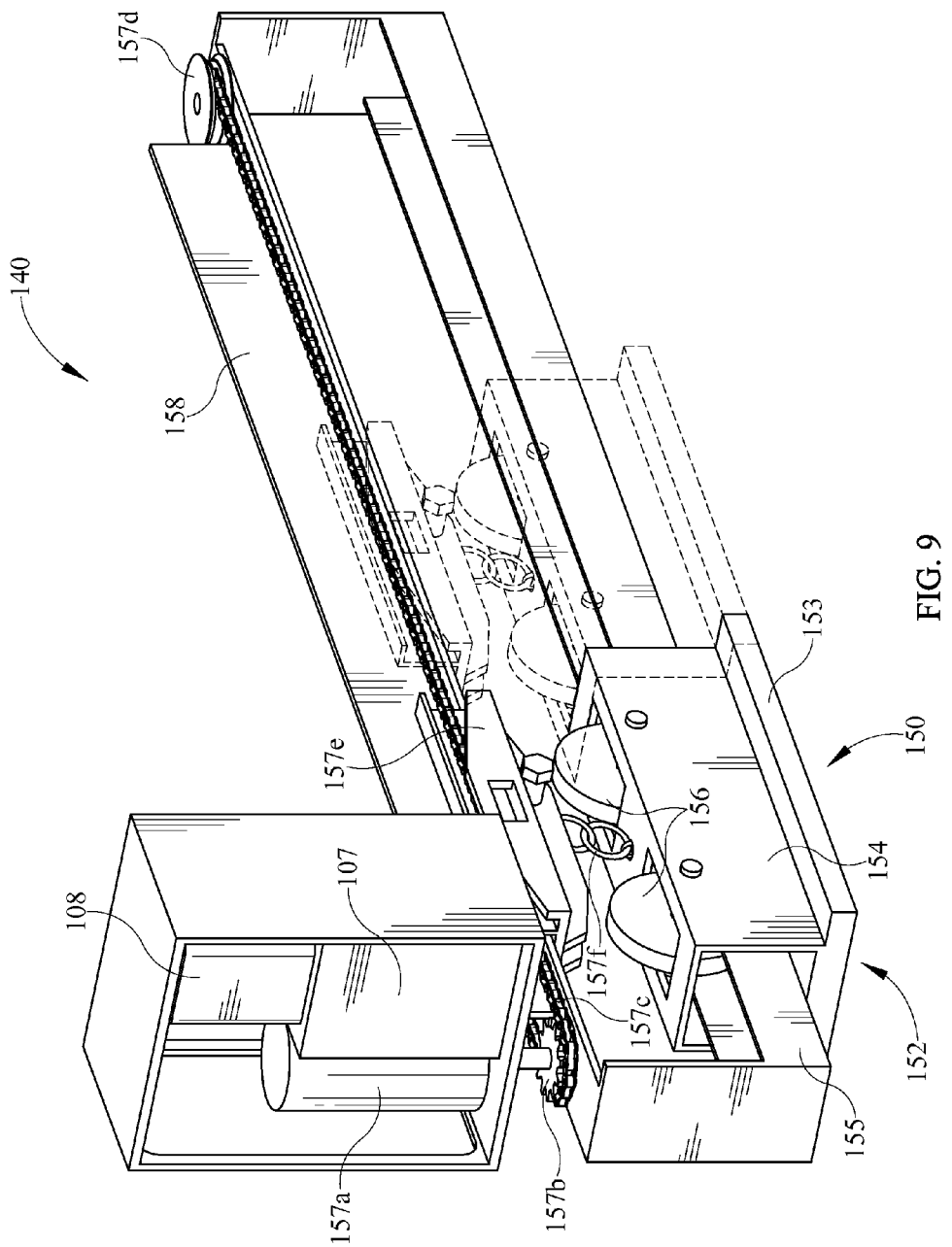
FIG. 9 shows a top perspective view of the leaning mechanism of FIG. 7, illustrating the weighted block and track guide in an unbalanced position, the position of the weighted block and track guide in the balanced position is shown in broken lines.

As shown in FIGS. 7-9, one embodiment of a leaning mechanism 150 of the steering mechanism 140 drives the SEGWAY 101 from the balanced position (FIG. 7) to an unbalanced position (FIG. 9) (forward or backwards). The leaning mechanism 150 simulates the riding user's center of gravity repositioning relative to the SEGWAY 101 in order to drive the SEGWAY forward and backwards. More specifically shown in FIG. 9, the leaning mechanism 150 includes a weighted body 152 that travels or slides along a U-shaped channel 155 between the front end and rear end of the transporter. The weighted body 152 may have a weight 153 of, but is not limited to, 13-35 lbs in order to properly balance the SEGWAY 101. The weight 153 is attached directly to a carrier 154 of the weighted body 152 that includes rollers 156 guided by the U-shaped channel 155. In the embodiment shown, the weighted body 152 is moved by a motor 157a and sprocket 157b combination along with a chain 157c. The chain 157c travels about a T-bar 158 between the sprocket 157b and a pulley 157d. The chain 157c is fixedly secured to a track guide 157e that is coupled to the weighted body 152 by a chain link 157f. The track guide 157e is secured about and guided by the bottom of the T-bar 158 and thus travels along the length of the T-bar 158. The chain 157c moves about the sprocket 157b and pulley 157d, as a result the fixed track guide 157e tracks linearly along the T-bar 158 pulling the weighted body 152 via the chain link 157f. A battery 107 and control device 108 operate the motor 157a and receives the signal from the user/controller 105 to move the weighted body 152 towards the front end of the transporter to simulate a rider leaning forward on the SEGWAY 101 to an unbalanced position (FIG. 9) thus making the SEGWAY move forward. As such, directing the weighted body 152 rearward places the SEGWAY 101 back to a balanced position (FIG. 7) or may direct the SEGWAY backwards.

Figure 11:
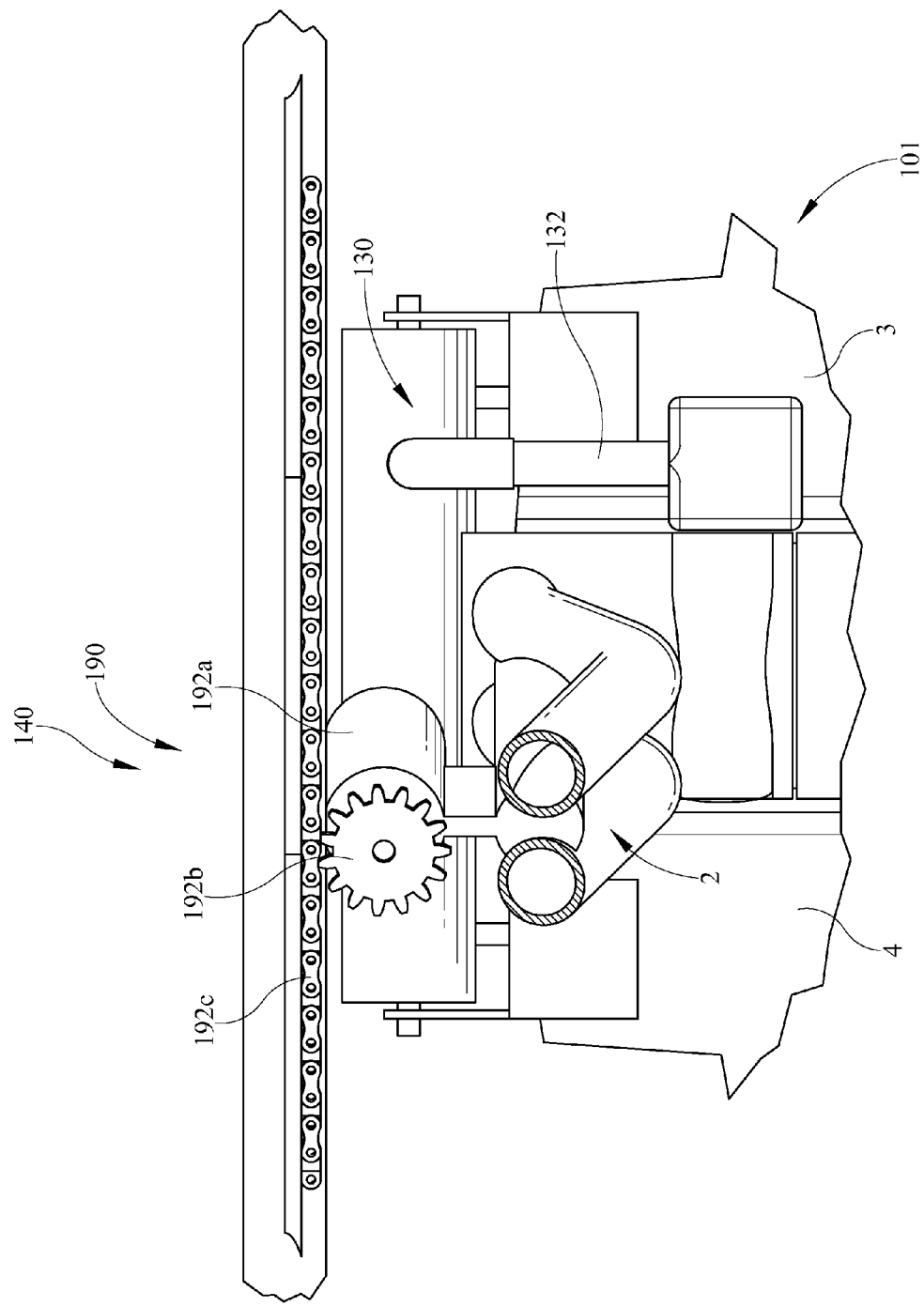
FIG. 11 shows a partial sectional, top view of the lateral steering mechanism of FIG. 10 taken along line 11-11, illustrating the SEGWAY handle in the left or lateral steering position.

As shown in FIGS. 7-11, one embodiment of a lateral steering mechanism 190 of the steering mechanism 140 turns the SEGWAY 101 from a straight or balanced steering position (FIG. 10) to a left or right steering/unbalanced lateral position (FIG. 11). The lateral steering mechanism 190 simulates a riding user steering the transporter in the lateral directions A. Therefore, the steering mechanism 140 allows the user to navigate the SEGWAY 101 as desired. As shown specifically in FIGS. 10 and 11, the SEGWAY handle 2 includes an attached motor 192a and sprocket 192b combination. The sprocket 192b is aligned with and travels along a fixed curved chain 192c coupled to the SEGWAY 101 adjacent the handle 2, similar to a rack and pinion mechanism. In use when the motor 192a is operated by the battery 107 and control device 108, the sprocket 192b rotates and drives the SEGWAY handle 2 either left (FIG. 11) or right/laterally relative to the fixed curved chain 192c thereby simulating a riding user turning the handle 2 thus directing the SEGWAY transporter left or right.

As shown in FIGS. 7 and 8, the elongated handle attachment 120 is coupled to the SEGWAY handle 2 by a hinged connection 123. The handle attachment 120 at least rotates or pivots in a plane perpendicular to the lateral movement/direction A of the SEGWAY handle 2. The handle attachment 120 can pivot between a downwardly position substantially parallel with the SEGWAY handle and a substantially horizontal position. The handle attachment 120 may also pivot to a kick-stand position (FIG. 8) by the user or automatically when the SEGWAY inadvertently malfunctions and shuts down. When the SEGWAY inadvertently malfunctions and rotates forward unexpectedly while a user is riding or not riding, the handle attachment 120 swings/pivots outward for a distance and abuts the adjacent ground and stops continued rotation of the SEGWAY 101. Thus, the kick-stand position (FIG. 8) of the handle attachment 120 may, but is not limited to, reduce injuries of the user, eases loading of equipment, or reduces damage to golf equipment or the SEGWAY itself. A personal electronic device 102 may also be coupled to the handle attachment 120 by a swivel mount 103.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. An apparatus for remotely operating a two wheeled, motorized, self-balancing personal transporter comprising:
   said two wheeled, motorized, self-balancing personal transporter with one or more rider detection sensors proximate a step pad, said personal transporter having a front end and a rear end with opposing left and right sides therebetween;
   a manual override mechanism positionable in a disengaged position and an engaged position with said one or more rider detection sensors, wherein said engaged position of said manual override mechanism simulates a user riding said transporter;
   when said manual override mechanism is in said engaged position, a lateral steering mechanism and a leaning mechanism coupled to said transporter are remotely operated by a user using a wireless controller to navigate said transporter;
   said leaning mechanism simulates a riding user's center of gravity repositioning relative to said transporter in order to move said transporter forward and backward; and
   said lateral steering mechanism simulates a riding user steering said transporter in lateral directions.

2. The apparatus for remotely operating said two wheeled, motorized, self-balancing personal transporter as in claim 1 wherein said transporter includes a handle, said lateral steering mechanism pivots said transporter handle between a lateral balanced position and a lateral position, said lateral position in the direction of said left or right side of said transporter.

3. The apparatus for remotely operating said two wheeled, motorized, self-balancing personal transporter as in claim 1 wherein said transporter includes a handle, an elongated handle attachment hingedly coupled to said transporter handle, said handle attachment positionable between a first position extending substantially horizontal away from said transporter handle and a second position extending substantially parallel with said transporter handle.

4. The apparatus for remotely operating said two wheeled, motorized, self-balancing personal transporter as in claim 1 wherein said transporter includes a handle, an elongated handle attachment hingedly coupled to said transporter handle wherein said handle attachment pivots into a kickstand position.

5. The apparatus for remotely operating said two wheeled, motorized, self-balancing personal transporter as in claim 1 further including a control device, battery, and one or more motors coupled with said leaning mechanism and said lateral steering mechanism.

6. The apparatus for remotely operating said two wheeled, motorized, self-balancing personal transporter as in claim 1 wherein said manual override mechanism has a slide plate, said slide plate positionable in said engaged position into overriding contact with each one of said one or more rider detection sensors and said disengaged position out of overriding contact with each one of said one or more rider detection sensors.

7. The apparatus for remotely operating said two wheeled, motorized, self-balancing personal transporter as in claim 1 wherein said leaning mechanism includes a weighted body movable between a balanced position and a unbalanced position relative to said transporter in order to move said transporter forward and backward.

8. The apparatus for remotely operating said two wheeled, motorized, self-balancing personal transporter as in claim 7 wherein said weighted body of said leaning mechanism travels by one or more rollers along a U-shaped channel extending between said front end and said rear end of said transporter.

9. An apparatus for remotely operating a two wheeled, motorized, self-balancing personal transporter comprising:
   said two wheeled, motorized, self-balancing personal transporter with one or more rider detection sensors proximate a step pad, said personal transporter having a handle, and said personal transporter having a front end and a rear end with opposing left and right sides therebetween;

a manual override mechanism positionable in a disengaged position and an engaged position with said one or more rider detection sensors, wherein said engaged position of said manual override mechanism simulates a user riding said transporter;

when said manual override mechanism is in said engaged position, a lateral steering mechanism and a leaning mechanism coupled to said transporter are remotely operated by the user using a wireless controller to navigate said transporter;

said leaning mechanism simulates a riding user's center of gravity repositioning relative to said transporter in order to move said transporter forward and backward, wherein said leaning mechanism includes a weighted body movable between a balanced position and an unbalanced position relative to said transporter in order to move said transporter forward and backward; and said lateral steering mechanism simulates a riding user steering said transporter in lateral directions, said lateral steering mechanism pivots said transporter handle between a lateral balanced position and a lateral position, said lateral position in a direction of said left or right side of said transporter.

10. The apparatus for remotely operating said two wheeled, motorized, self-balancing personal transporter as in claim 9 further including an elongated handle attachment hingedly coupled to said transporter handle, said handle attachment positionable between a first position extending substantially horizontal away from said transporter handle and a second position extending substantially parallel with said transporter handle.

11. The apparatus for remotely operating said two wheeled, motorized, self-balancing personal transporter as in claim 9 further including an elongated handle attachment hingedly coupled to said transporter handle wherein said handle attachment pivots into a kick-stand position.

12. The apparatus for remotely operating said two wheeled, motorized, self-balancing personal transporter as in claim 9 further including a control device, battery, and one or more motors coupled with said leaning mechanism and said lateral steering mechanism.

13. The apparatus for remotely operating said two wheeled, motorized, self-balancing personal transporter as in claim 9 wherein said weighted body of said leaning mechanism travels by one or more rollers along a U-shaped channel extending between said front end and said rear end of said transporter.

14. The apparatus for remotely operating said two wheeled, motorized, self-balancing personal transporter as in claim 9 wherein said wireless controller can be carried on the user's body or clothing while navigating said remotely operated transporter.

15. The apparatus for remotely operating said two wheeled, motorized, self-balancing personal transporter as in claim 9 wherein said manual override mechanism has a slide plate, a base plate, and one or more tabs, said slide plate is slidably engaged to said base plate; and said slide plate positionable in said engaged position towards said front end of said personal transporter whereby said one or more tabs are biased downwardly into overriding contact with each one of said one or more rider detection sensors and said disengaged position towards said rear end of said personal transporter whereby said one or more tabs are unbiased upwardly out of overriding contact with each one of said one or more rider detection sensors.

16. The apparatus for remotely operating said two wheeled, motorized, self-balancing personal transporter as in claim 15 wherein said base plate further includes one or more upwardly projecting bolts and said slide plate includes one or more slots receiving each one of said one or more upwardly projecting bolts that provide for the slidable engagement between said slide plate and said base plate.

17. An apparatus for remotely operating a two wheeled, motorized, self-balancing personal transporter comprising:

the two wheeled, motorized, self-balancing personal transporter with one or more rider detection sensors proximate a step pad;

a manual override mechanism positionable in a disengaged position and an engaged position with said one or more rider detection sensors, wherein said engaged position of said manual override mechanism simulates a user riding said transporter;

when said manual override mechanism is in said engaged position, a steering mechanism is remotely operated by a user using a wireless controller to navigate said transporter; and said steering mechanism coordinates a lateral steering mechanism and a leaning mechanism coupled to said transporter to simulate a riding user.

18. An apparatus for remotely operating said two wheeled, motorized, self-balancing personal transporter as in claim 17 wherein said leaning mechanism simulates a riding user's center of gravity repositioning relative to said transporter in order to move said transporter forward and backward, and said lateral steering mechanism simulates a riding user steering said transporter in lateral directions.

19. An apparatus for remotely operating said two wheeled, motorized, self-balancing personal transporter as in claim 17 further including an elongated handle attachment hingedly connected to a handle of said transporter and rotatable in a plane perpendicular to a lateral movement of said transporter handle.

20. An apparatus for remotely operating said two wheeled, motorized, self-balancing personal transporter as in claim 17 further including a control device, battery, and one or more motors coupled with said leaning mechanism and said lateral steering mechanism.

* * * * *